(12) United States Patent
Whiting

(10) Patent No.: US 6,406,168 B1
(45) Date of Patent: Jun. 18, 2002

(54) HELMET MOUNTED BRAKE LIGHTS

(76) Inventor: William Scott Whiting, 37 Angela Way, Berkeley Heights, NJ (US) 07922

(*) Notice: Subject to any disclaimer, the term of this patent is extended or adjusted under 35 U.S.C. 154(b) by 0 days.

(21) Appl. No.: 09/759,478

(22) Filed: Jan. 12, 2001

(51) Int. Cl.$^7$ .................. F21W 101/027; F21W 101/14
(52) U.S. Cl. ................ 362/473; 362/105; 362/106; 362/802
(58) Field of Search ................. 362/105, 106, 362/473, 543, 544, 545, 540, 541, 183, 802, 251

(56) References Cited

U.S. PATENT DOCUMENTS

| | | | |
|---|---|---|---|
| 4,195,328 A | 3/1980 | Harris, Jr. ............ | 362/72 |
| 4,760,373 A | 7/1988 | Reilly ............... | 340/134 |
| 4,769,629 A | 9/1988 | Tigwell .............. | 340/134 |
| 4,862,331 A | 8/1989 | Hanabusa ............ | 362/106 |
| 4,901,210 A | 2/1990 | Hanabusa ............ | 362/106 |
| 4,956,752 A | 9/1990 | Foglietti ............ | 362/72 |
| 5,040,099 A | 8/1991 | Harris ............... | 362/72 |
| 5,353,008 A | 10/1994 | Eikenberry .......... | 340/479 |
| 5,416,675 A * | 5/1995 | DeBeaux ............. | 362/106 |
| 5,477,209 A | 12/1995 | Benson .............. | 340/479 |
| 5,704,707 A * | 1/1998 | Gebelein et al. ..... | 362/106 |
| 5,910,764 A | 6/1999 | Hayden .............. | 340/479 |

* cited by examiner

Primary Examiner—Laura K. Tso
(74) Attorney, Agent, or Firm—Nydegger & Associates

(57) ABSTRACT

A helmet lighting system for a motorcycle helmet includes a transmitter mounted on a motorcycle for broadcasting a radio-frequency signal to a receiver mounted on the motorcycle helmet. The transmitter includes a microprocessor that is connected to the brake light circuit, the running light circuit, the turn signal circuits and hazard circuit of the motorcycle. When one of the motorcycle lighting circuits is energized, the transmitter microprocessor generates and broadcasts a radio-frequency signal containing a function-specific code. The receiver receives the code and signals a pulse generator to create a function-specific electrical pulse package in a circuit containing a plurality of light emitting diodes to thereby simulate a running light, brake light, turn indicator or hazard light.

24 Claims, 3 Drawing Sheets

HELMET MOUNTED BRAKE LIGHTS

FIELD OF THE INVENTION

The present invention pertains generally to helmet lighting systems. More particularly, the present invention pertains to a motorcycle helmet lighting system. The present invention is particularly, but not exclusively, useful for a motorcycle helmet lighting system capable of establishing wireless links between a transmitter mounted on a motorcycle and one or more motorcycle helmets.

BACKGROUND OF THE INVENTION

In the mid 80's, the U.S. government researched automotive tail light positioning and found that significantly fewer accidents occur in vehicles having a brake light positioned at or near the highest point on the rear of the vehicle. In 1986, the U.S. government mandated that automobiles sold in the U.S. be equipped with a third brake light positioned near the highest point on the rear of the vehicle. To date, a similar law has not been passed for motorcycles.

The risks associated with riding a motorcycle are generally higher than driving an automobile for several reasons. First, motorcycles are smaller than automobiles and other motorists often have a hard time seeing motorcycles on the roads. Further, motorcycles are generally capable of higher rates of acceleration than automobiles causing other motorists to often lose track of the position of a nearby motorcycle. Also, motorcycles are generally capable of higher rates of de-acceleration than automobiles causing motorcycles to often be hit from behind by motorists that are unable to stop in time. Finally, motorcycles lack the weight, protective structure and other assorted safety devices such as airbags that are offered by automobiles.

A typical tail light assembly for a motorcycle includes a running light, a brake light, turn indicators and hazard indicators. For most motorcycles, the running light is always lit when the ignition circuit is energized. In a few motorcycles, the running light is only energized when the headlight is manually turned on by the rider. Typically the tail light is mounted at the rear of the motorcycle above the rear fender. Depending on the size and style of the motorcycle, the tail light is often relatively low to the ground and hard to see by other motorists.

Some states now require motorcyclist to wear helmets. To be effective as a safety device, a motorcycle helmet must be properly sized to fit the wearer. Typically, a motorcycle owner acquires a properly sized helmet for personal use and an additional helmet for passenger use. The passenger helmet may or may not be sized for a specific individual. When a helmet lighting system is used, it is important that the light on the drivers helmet be operative when a passenger is not riding on the motorcycle. Additionally, when a passenger is riding on the motorcycle, it is important that the light on the passengers helmet be operative and the light on the drivers helmet be inoperative. This setup avoids shining a bright light in the passenger's face.

Several additional safety concerns must be considered when contemplating the installation of a lighting system on a helmet. First, a wireless link between the helmet and the motorcycle is preferred over a wired system to prevent a variety of possible wire related injuries that could occur during an accident. Second, safe voltages and lamp temperatures should be used to avoid exposing the rider to these hazards in the event that an accident exposes the rider to a live circuit or lamp.

In a wireless system, a power source such as a battery must generally be attached to the helmet. For the helmet assembly, a small battery is beneficial for several reasons. First, a large, heavy battery may cause discomfort for the rider. Additionally, large batteries are generally more expensive than smaller batteries. To complement a smaller battery, the power draw of the receiver components should be minimized to lengthen battery life and reduce the need for battery recharge or replacement. On the other hand, for a helmet lighting system to be effective, a minimum lamp illumination intensity must be provided to allow nearby motorists to see the lamp signal. Consequently, there is a need to produce a high intensity helmet lighting system that is energy efficient.

Heretofore, suggestions have been made to achieve energy efficiency in a helmet light system. For example, U.S. Pat. No. 5,353,008 which issued to Eikenberry et al. for an invention entitled "Headgear with Safety Light" discloses a motorcycle helmet with a brake light that includes a duty cycled receiver circuit for receiving a radio-frequency signal from a transmitter located on the motorcycle. Rather than using a duty cycled receiver circuit, the present invention uses a duty cycled power circuit to energize the brake lamp. This advancement recognizes that modern receiver circuits use relatively little power, and that most of the power that is dissipated in a helmet lighting system is used to energize the lamps. Further, the present invention contemplates that a helmet mounted running lamp may be operable whenever the motorcycle is in use. This continuous lamp usage mandates that energy efficiency be achieved in the lamp circuit.

In light of the above, it is an object of the present invention to provide an energy efficient lighting system for a vehicle helmet. It is another object of the present invention to provide a wireless system capable of displaying brake lights, running lights, turn indicators, hazard lights, and emergency lights for police motorcycles, on a single vehicle helmet. It is yet another object of the present invention to provide a helmet lighting system having a transmitter capable of broadcasting a unique code set, thereby preventing interference between motorcycles when two or more system equipped motorcycles are in close proximity. It is yet another object of the present invention to provide a helmet lighting system having a transmitter capable of broadcasting more than one code set, thereby allowing several helmet receivers to be used independently with one transmitter. Yet another object of the present invention is to provide a helmet lighting system that is safe, easy to use and comparatively cost effective.

SUMMARY OF THE PREFERRED EMBODIMENTS

The present invention is directed to a helmet lighting system for a motorcycle helmet that includes a transmitter mounted on a motorcycle for transmitting a radio-frequency signal to a receiver mounted on the motorcycle helmet. The transmitter further includes a transmitter microprocessor that is mounted on the motorcycle and connected to the lighting circuits of the motorcycle. Specifically, the brake light circuit, the running light circuit, the turn signal circuits and the hazard circuit can all be monitored by the transmitter microprocessor. When the transmitter microprocessor receives a voltage from one of the motorcycle lighting circuits indicating that the lighting circuit is energized, the transmitter microprocessor generates a function-specific code and sends that code to a modulator. The modulator receives the code from the transmitter microprocessor and modulates the code onto a radio-frequency signal for transmission by an antenna.

The helmet lighting system further includes a receiver mounted on the helmet. The receiver energizes one or more lamps in response to the radio-frequency signal from the transmitter. The lamps are mounted on the exterior surface of the helmet and positioned to face rearward. For the present invention, the receiver includes an antenna, a demodulator and a receiver microprocessor, all attached to the helmet. The antenna receives the radio-frequency signal containing the function-specific code and forwards the signal to the demodulator. Next, the demodulator extracts the function-specific code from the radio-frequency signal and forwards the code to the receiver microprocessor.

To ensure that the radio-frequency signal that is received by the helmet originated from the proper motorcycle transmitter, the receiver microprocessor compares the received code to a stored code. If the received code does not match the stored code, the received code is disregarded by the receiver microprocessor. If the received code matches the stored code, the receiver microprocessor signals a pulse generator to create a function-specific electrical pulse package in a pulse circuit. Lamps, which may consist of a plurality of light emitting diodes (LED's) are connected to the pulsed circuit. The function-specific pulse package flows through the pulsed circuit and illuminates the lamps to simulate a specific lighting function such as a brake light. For the present invention, the pulse generator can generate a variety of pulse packages that vary in pulse rate, pulse length, and may contain deenergized periods of varying lengths to thereby simulate the various lighting functions including brake lights, running lights, turn indicators and hazard lights. As such, each pulse package has a duty cycle associated with it that is indicative of the power required to produce the lighting function. By varying the features of the pulse package, lighting functions having different lamp illumination intensities and flashing patterns can be created. For example, to simulate a brake light, the function-specific pulse package generated by the pulse generator may consist of pulse periods having relatively high pulse rates and relatively long pulse lengths, with short de-energized periods interposed between the pulse periods. The result is a high intensity light with a visibly noticeable flash that requires less power than a continuous high intensity light. Conversely, to create the low intensity light needed to simulate a running light, the function-specific pulse package generated may consist of pulse periods having relatively low pulse rates and relatively short pulse lengths, with or without de-energized periods interposed between the pulse periods.

A power source such as a battery is provided in the receiver to supply power to the pulse circuit, receiver microprocessor, antenna and demodulator. To conserve energy during non-use, a motion sensor is provided in the receiver to disconnect the power source from the remaining receiver components if the helmet remains motionless for a predetermined time interval. The receiver microprocessor will prevent the motion sensor from disconnecting the power source if any function-specific codes are received from the transmitter during a predetermined time interval. Once the power source is disconnected, any motion detected by the motion sensor will cause the power source to be reconnected to the remaining receiver components.

For purposes of the present invention, it is desired that each transmitter broadcast a set of codes that are unique to the transmitter to prevent interference between motorcycles when two or more system equipped motorcycles are in close proximity. Further, it is desired that a single transmitter have the capability to broadcast more than one code set to allow several helmet receivers to be used independently with one transmitter. To satisfy these objectives, the helmet lighting system provides a teach and learn protocol for establishing a wireless communication link between a transmitter and a receiver. Specifically, a transmitter can be toggled between a teach mode and an operational mode by the manual manipulation of a mode switch connected to the transmitter microprocessor. To accommodate several helmet receivers, each transmitter can include primary and secondary teach modes and primary and secondary operational modes. Similarly, each receiver can be toggled between a learn mode and an operational mode by the manual manipulation of a mode switch connected to the receiver microprocessor. In one embodiment of the present invention, a cord extending from the transmitter is used to toggle the receiver into learn mode. When the cord is engaged in a socket on the receiver, the receiver toggles into learn mode and sends a signal through the cord to the transmitter verifying that learn mode has been set.

Upon placing the transmitter in a teach mode, the transmitter microprocessor first establishes a unique code set for the receiver. The established code set consists of a function-specific code for each of the motorcycle lighting circuits, such as the brake, running light, turn signals and hazard circuits, that are to be simulated by the helmet lamps. In one embodiment of the present invention, the transmitter microprocessor randomly selects the codes for the code set from a group of at least 2500 potential codes, thus creating a unique code set. In another embodiment, unique codes for each code set are factory selected, and remain fixed for the life of each transmitter. Once the code set is established, and while the transmitter is still in teach mode, the transmitter modulates the code set onto a radio-frequency signal and broadcasts the signal through the transmitter antenna. When the code set is received by a receiver that is set in learn mode, the receiver will store the code set in memory, overwriting any previously stored codes. When the code set is received by a receiver that is set in operational mode, the receiver will not overwrite the stored codes in response to a transmitted code set. Once the code set has been stored by the receiver, the transmitter can be placed in operational mode by manual manipulation of the mode switches. The receiver can be placed in operational mode by removing the cord, or, if a cord is not used, by toggling a mode switch. As indicated above, a transmitter may be placed in a secondary teach mode for teaching a second code set to a second helmet, such as a passengers helmet. Once both helmet receivers have stored a unique code set, one of the helmets can be selected for operational use by setting the mode switch on the transmitter to the desired operational mode for the selected helmet (primary operational mode or secondary operational mode).

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
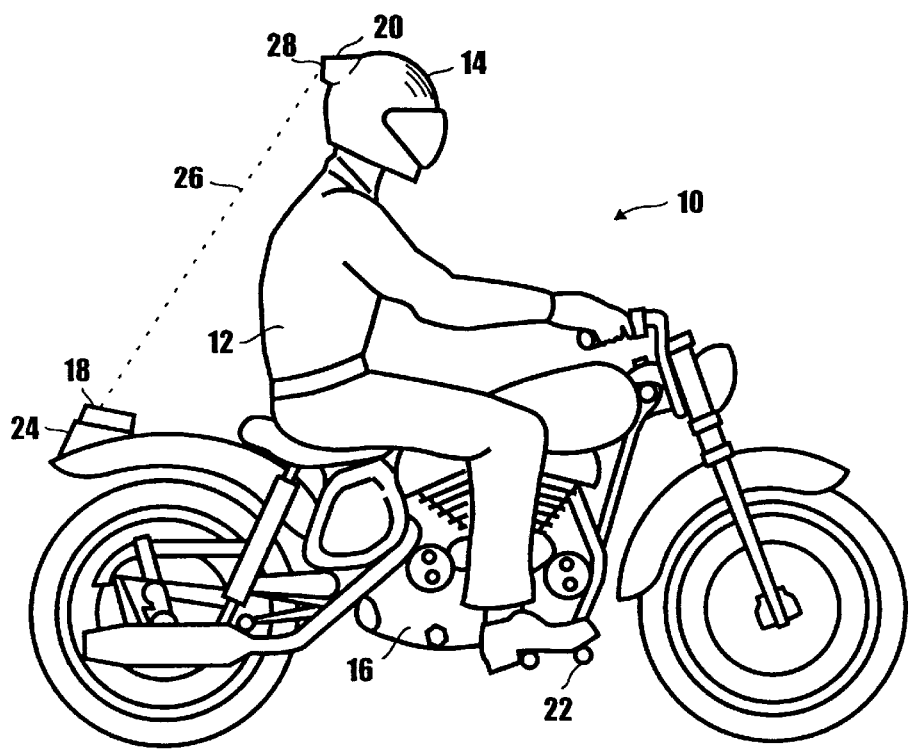
FIG. 1 is a side elevational view of motorcyclist wearing a helmet riding a motorcycle showing the helmet mounted lighting system of the present invention.

Referring to FIG. 1, a helmet lighting system in accordance with the present invention is shown and generally designated 10. For discussion purposes, FIG. 1 shows a rider 12 wearing a motorcycle helmet 14 riding a motorcycle 16. For the present invention, the system 10 includes a transmitter 18 and a receiver 20. As shown, the transmitter 18 is mounted to the motorcycle 16. Also shown, the receiver 20 is preferably mounted to the helmet 14 behind the head of the rider 12. A brief description of the operation of the system 10 can be appreciated with further reference to FIG. 1. When the rider 12 depresses the brake pedal 22, an electrical current is forced to flow in the brake circuit of the motorcycle 16 illuminating the brake light 24 of the motorcycle 16. In response, the transmitter 18 receives a voltage signal indicating current flow in the brake circuit and transmits a signal 26 containing a function-specific code to the receiver 20. Upon receiving the signal 26 containing the function-specific code, the receiver 20 illuminates a lamp 28 on helmet 14 to simulate a brake light.

In accordance with the present invention, the transmitter 18 can transmit a function-specific code in response to a current flow in any lighting circuit of the motorcycle 16 such as the running light circuit, a turn indicator circuit or the hazard circuit. As described in detail below, all of the lighting circuits for the motorcycle 16 can be monitored by the transmitter 18, allowing for the transmission of a function-specific code representing each lighting circuit to the receiver 20. Also described in detail below, the receiver 20 contains a plurality of lamps 28 for simulating the various tail light functions of the motorcycle 16. The receiver 20 is capable of receiving all of the function-specific codes generated by the transmitter 18 and responding to each function-specific code by selectively energizing one or more of the lamps 28 to simulate the specific tail light function represented by the function-specific code. For example, the receiver 20 can receive a code from the transmitter 18 indicating that the left turn signal circuit of the motorcycle 16 is energized, and respond to that code by causing a lamp 28 positioned on the rear, left side of the helmet 14 to flash.

Figure 2A:
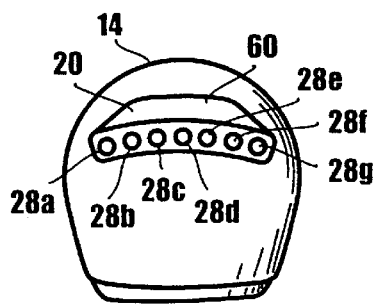
FIG. 2A is a rear elevational view of a helmet showing one embodiment of a receiver including lamps in accordance with the present invention.
Figure 3A:
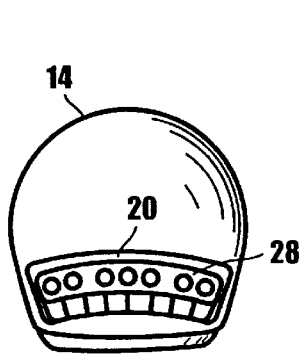
FIG. 3A is a rear elevational view of a helmet showing another embodiment of a receiver including lamps in accordance with the present invention.
Figure 4A:
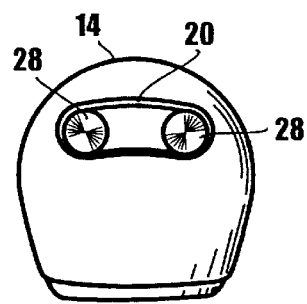
FIG. 4A is a rear elevational view of a helmet showing still another embodiment of a receiver including lamps in accordance with the present invention.
Figure 2B:
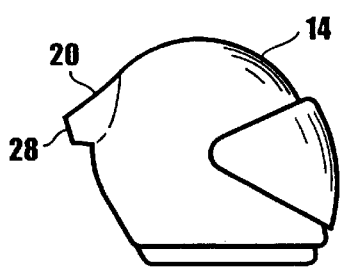
FIG. 2B is a side elevational view of the helmet shown in FIG. 2A.
Figure 3B:
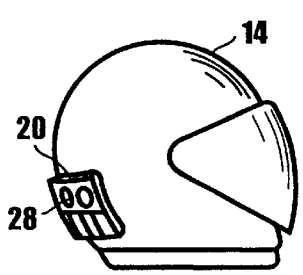
FIG. 3B is a side elevational view of the helmet shown in FIG. 3A.
Figure 4B:
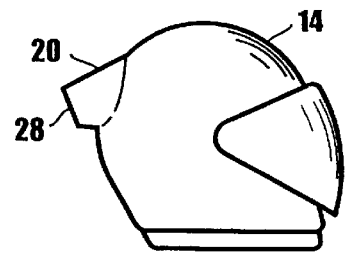
FIG. 4B is a side elevation view of the helmet shown in FIG. 4A.

FIGS. 2–4 show several receiver 20 embodiments for the present invention. As shown, these embodiments differ in both the number and arrangement of the lamps 28 and in the placement of the receiver 20 relative to the helmet 14. For example, the embodiment shown in FIGS. 2A and 2B shows a receiver 20 mounted near the top of the helmet 14, and includes seven lamps 28a–g. Preferably, lamps 28c–e can be utilized to simulate both running lights and brake lights, and lamps 28a–b and 28f–g can be used to simulate both turn indicators and hazard lights. FIGS. 3A and 3B show an embodiment of the present invention wherein the receiver 20 containing lamps 28 is mounted near the bottom of helmet 14. Finally, FIGS. 4A and 4B show an embodiment for a receiver 20 having only two lamps 28. For this embodiment, a running light can be simulated by moderately illuminating both lamps 28. Similarly, a brake light can be simulated by illuminating both lamps 28 with high intensity. To simulate a left turn indicator, the left lamp 28 can be made to flash on and off while the right lamp 28 remains illuminated as a running or brake light. To simulate a hazard light, both lamps 28 can be made to flash on and off.

Figure 5:
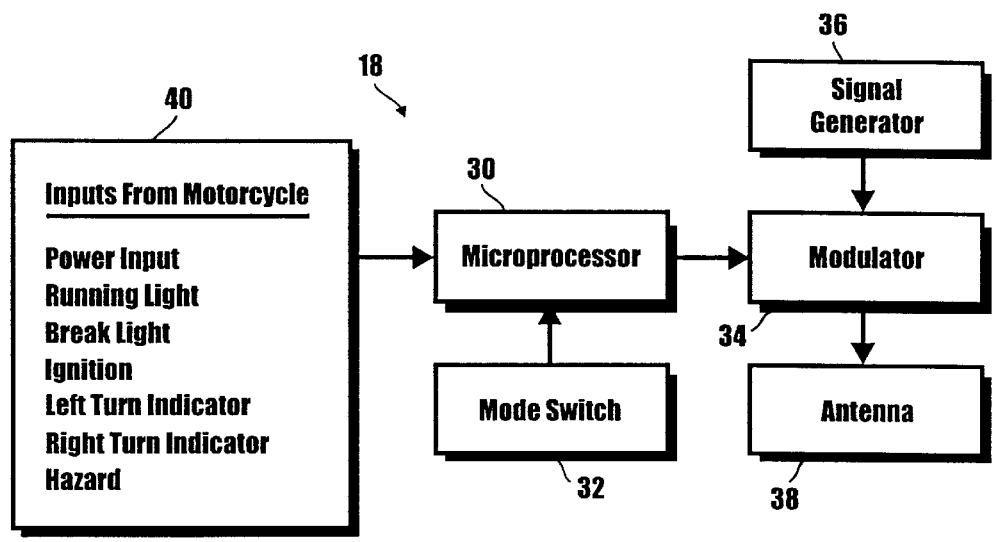
FIG. 5 is a functional block diagram showing the interactive components of a representative transmitter for the present invention.

A more detailed understanding of a transmitter 18 for the present invention can be obtained by referencing FIG. 5. As shown in FIG. 5, a transmitter 18 for the present invention can include a microprocessor 30, such as Micro Chip PIC-12CE518A, having a mode switch 32. The transmitter 18 may further include a modulator 34, a signal generator 36 and an antenna 38. Preferably, the transmitter 18 and microprocessor 30 are grounded to the motorcycle 16. For the present invention, the microprocessor 30 is electrically connected to several circuits of the motorcycle 16 for the purpose of receiving the motorcycle inputs 40. For applications where the transmitter 18 is prepared for use on more than one motorcycle make/model, an optoisolator such as NEC PS 2505-2 can be incorporated to allow the transmitter 18 to accommodate the various voltages and polarities found in the lighting circuits of different motorcycles. For the present invention, one or more wires can be used to connect a lead or leads from the microprocessor 30 to the brake light circuit of the motorcycle 16 allowing the microprocessor 30 to receive a voltage whenever current flows in the brake light circuit. Preferably, the connection with the brake light circuit is made so that the microprocessor 30 will still register a voltage even if the brake light 24 in the circuit is unable to pass current. For example, two microprocessor 30 leads can be placed in parallel with the brake light 24 to ensure that the microprocessor 30 receives a voltage when the brake lever is engaged, regardless of whether the brake light 24 is able to pass current.

When the microprocessor 30 receives a voltage from one of the lighting circuits of the motorcycle 16 indicating that the lighting circuit is energized, the microprocessor 30 generates a function-specific code and sends that code to the modulator 34. As shown in FIG. 5, and further described in detail below, a mode switch 32 is provided to allow the transmitter 18 to establish wireless links with more than one receiver 20. Specifically, in the preferred embodiment of the present invention, the microprocessor 30 can establish and use a unique set of function-specific codes (code set) for at least two receivers 20.

Once the microprocessor 30 generates the function-specific code, the function-specific code is sent to a modulator 34. The modulator 34 receives the function-specific code from the microprocessor 30 and a transmission signal from the signal generator 36. Preferably, the transmission signal is a radio-frequency signal. The modulator 34 modulates the function-specific code onto the transmission signal and sends the transmission signal containing the function-specific code to the antenna 38. The antenna 38 broadcasts the signal 26 containing the function-specific code to the receiver 20.

Preferably, the transmitter 18 sends a continuous radio-frequency signal 26 whenever the ignition system of the motorcycle 16 is energized. Further, in the preferred embodiment, a function-specific code is sent to the modulator every one-half (0.5) second. For example, if the brake light circuit of the motorcycle 16 is energized for 20 seconds, a brake code will be produced by the microprocessor 30 for transmission every 0.5 seconds during the 20 seconds that the brake light circuit is energized. As described further below, if none of the lighting circuits of the motorcycle 16 are energized, the microprocessor 30 will send a stay-alive code for transmission to the receiver 20.

Figure 6:
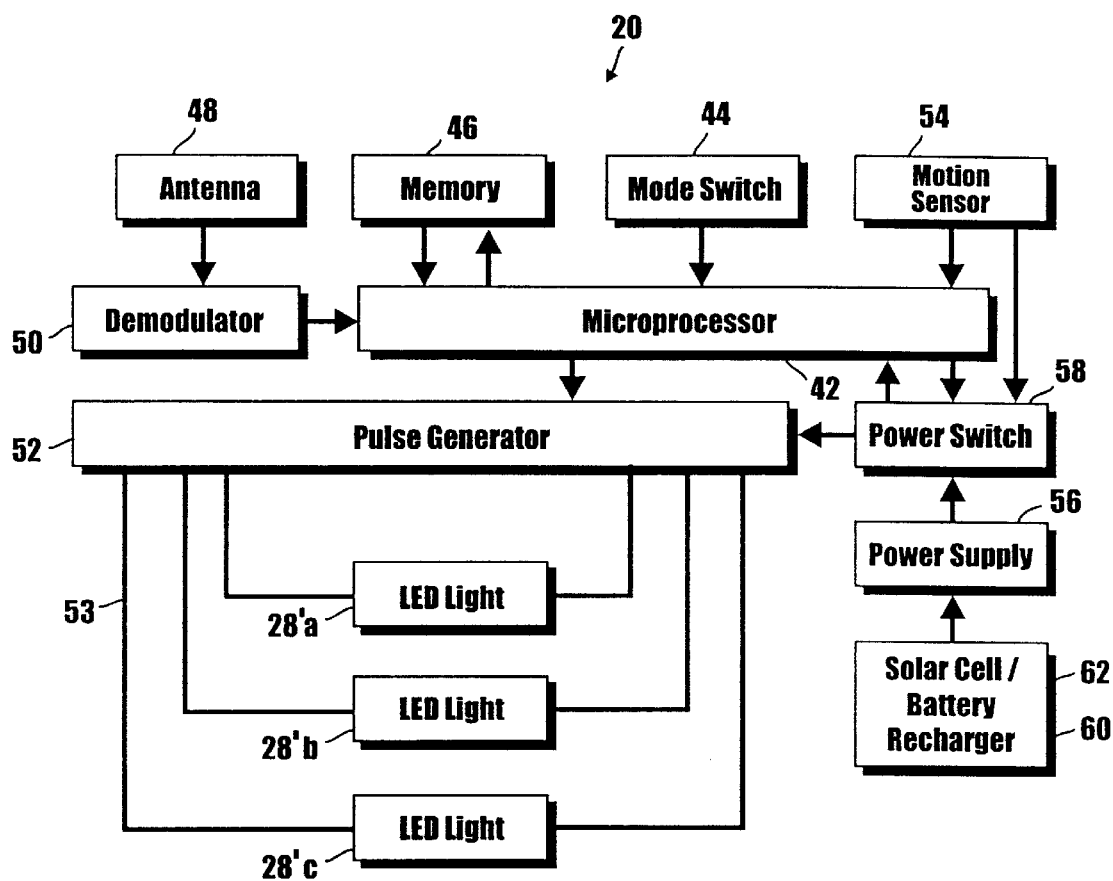
FIG. 6 is a functional block diagram showing the interactive components of a representative receiver for the present invention.

A more detailed understanding of a receiver 20 for the present invention can be obtained by referencing FIG. 6. As shown in FIG. 6, a receiver 20 for the present invention can include a microprocessor 42, such as Micro Chip PIC 16C671, having a mode switch 44 and a memory 46. The receiver 20 can further include an antenna 48, a demodulator 50, a pulse generator 52, such as an International Rectifier IRF-7101, lamps 28'a–c, a motion sensor 54, a power supply 56, a power switch 58, a solar cell 60 and a battery recharger 62. As shown in FIG. 1, the receiver 20 receives the signal 26 from the transmitter 18. Referring now to FIG. 6, the antenna 48 receives the transmission signal containing the function-specific code and sends the signal and code to the demodulator 50. The demodulator 50 extracts the function-specific code from the signal and sends the function-specific code to the microprocessor 42.

As shown, the microprocessor 42 includes a mode switch 44 and a memory 46. In the preferred embodiment of the present invention, the mode switch 44 has two settings, learn mode and operational mode. In one embodiment, the mode switch 44 can be manually set by the operator. The mode switch 44 can be a button, pressure switch or an internal magnetic switch that can be activated by holding a magnet near the receiver 20. Alternatively, a cord extending from the transmitter 18 can be inserted into a socket in the receiver 20 to thereby place the receiver 20 into learn mode. Removal of the cord will place the receiver 20 into operational mode. A code set can be stored in the memory 46 to verify that a received operational function-specific code originated from the proper transmitter 18. When the mode switch 44/microprocessor 42 is placed in learn mode, the microprocessor 42 can receive a code set from the transmitter 18 and overwrite the existing code set that is stored in memory 46 with the received code set. This allows a helmet to be re-coded and thereby establish a wireless link with more than one transmitter 18. As further detailed below, when the mode switch 44/microprocessor 42 is placed in operational mode, the code set stored in memory 46 can be used to verify that a received function-specific code originated from the proper transmitter 18.

When the microprocessor 42 is set in operational mode, the microprocessor 42 compares each received function-specific code to the code set stored in memory 46 and if a match is found, then the microprocessor 42 signals the pulse generator 52 to establish a function-specific pulse package 64 (shown in FIG. 7) in the pulsing circuit 53. A pulsing circuit 53 having a pulse generator 52 and a plurality of lamps 28'a–c is shown in FIG. 6 for simulating tail light functions such as brake lights, turn indicators, running lights and hazard lights.

Figure 7:
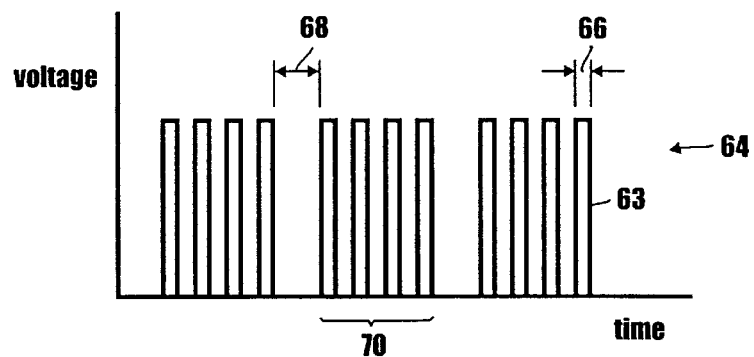
FIG. 7 is a graph of voltage versus time showing an exemplary pulse package for use in simulating a light function.

With cross reference to FIGS. 6 and 7, it can be seen that the pulse generator 52 can generate pulses 63 in a variety of pulse packages 64 that vary in pulse rate, pulse length 66, and may contain de-energized periods 68 of varying lengths to thereby simulate the various lighting functions including brake lights, running lights, turn indicators and hazard lights. As such, each pulse package 64 has a duty cycle associated with it that is indicative of the power required to produce the lighting function. Specifically, the duty cycle is the amount of time the pulsing circuit 53 is energized divided by the amount of time the pulsing circuit 53 is de-energized. By varying the features of the pulse package 64, the illumination intensity and flashing pattern of the lamp's 28 can be varied. For example, to simulate a brake light, the function-specific pulse package 64 generated by the pulse generator 52 may consist of pulse periods 70 having relatively high pulse rates and long pulse lengths 66, with short de-energized periods 68 interposed between the pulse periods 70. The result is a high intensity light with a visibly noticeable flash that requires less power than a continuous high intensity light. Conversely, to create the low intensity light needed to simulate a running light, the function-specific pulse package 64 generated may consist of pulse periods 70 having relatively low pulse rates and short pulse lengths 66, with or without de-energized periods 68 interposed between the pulse periods 70. For the present invention, the pulse generator 52 has the capability of providing different pulse packages to a plurality of lamps 28'a–c simultaneously, thereby allowing each lamp 28'a–c to be pulsed independently.

When signaled by the microprocessor 42, the pulse generator 52 establishes a function specific electrical pulse package in a pulse circuit 53 that contains one or more of the lamps 28'a–c. Preferably, the electrical pulse package is generated in the pulse circuit 53 for a predetermined amount of time. For example, if the timing circuit for the transmitter 18 is set to send a function-specific code every 0.5 seconds, then the pulse generator 52 will generate a pulse package in the pulsing circuit 53 that lasts for 0.5 seconds and then wait for another signal.

As shown in FIG. 6, the receiver 20 includes a power supply 56 such as a battery. As shown in FIGS. 2A and 6, the receiver 20 can include an optional solar cell 60 to recharge the power supply 56. Further, an optional battery charger 62 can be provided to recharge the power supply 56. An optional cord can be provided to plug the battery charger 62 into a household outlet, or the cord can be connected from the transmitter 18 to allow the power supply 56 to be charged from the motorcycle battery. To conserve power, an optional motion sensor 54 can be included in the receiver 20 to disconnect the power supply 56 at the power switch 58 from the remaining components of the receiver 20. Preferably, upon a lack of motion for a predetermined period such as five minutes, the motion sensor 54 sends a shutdown signal to the microprocessor 42. The microprocessor 42 then determines whether any codes have been received during a previous time interval such as the one minute time interval immediately preceding receipt of the shutdown signal from the motion sensor 54. If any codes originating from the proper transmitter 18 have been received, indicating that the transmitter 18 is operating, then the microprocessor 42 ignores the shutdown signal from the motion sensor 54 leaving all components of the receiver 18 energized.

Preferably, a stay-alive code is periodically sent by the transmitter 18 whenever the ignition system of the motorcycle 16 is energized. The stay-alive code prevents a receiver 20 from shutdown during a period when the ignition system of the motorcycle 16 is energized, the helmet 14 is motionless, and none of the lighting circuits of the motorcycle 16 are energized. Upon receipt of a shutdown signal and verification that a code from the transmitter 18 has not been received during the predetermined time interval, the microprocessor 42 will forward the shutdown signal from the motion sensor 54 to the power switch 58 which, in turn, will disconnect the power supply 56 from the remaining components of the receiver 20. Upon detecting motion, the motion sensor will send a power-up signal to the power switch 58 that will cause the power switch 58 to connect the power supply 56 to the remaining components of the receiver 20, if the power supply 56 is not already connected to the components of the receiver 20. To further save power, the microprocessor 42 can be programmed to go into a low power consumption sleep mode upon the absence of a stay-alive code for a predetermined period (regardless of motion). Any code will return the microprocessor 42 to active mode from sleep mode.

For purposes of the present invention, it is desired that each transmitter 18 broadcast a unique set of function-specific codes to prevent interference between motorcycles 16 when two or more motorcycles 16 are in close proximity. Further, it is desired that a single transmitter 18 have the capability to broadcast more than one code set to allow several receivers 20 to be used independently with one transmitter 18. Specifically, in the preferred embodiment of the present invention, a single transmitter 18 can broadcast to a primary and secondary receiver 20, independently. For the present invention, the system 10 provides a teach and learn protocol for establishing a wireless communication link between a single transmitter 18 and a plurality of receivers 20 such as a primary receiver 20 and a secondary receiver 20. Since each receiver 20 is capable of being re-coded, each receiver 20 can be used as either a primary receiver 20 or a secondary receiver 20. Preferably, each transmitter 18 has a microprocessor 30 configurable between four different modes; a primary teach mode, a secondary teach mode, a primary operational mode and a secondary operational mode. Preferably, the microprocessor 30 can be configured into one of these modes by the manual manipulation of the mode switch 32. Similarly, each receiver 20 preferably has a microprocessor 42 that can be reconfigured between two modes; a learn mode and an operational mode. The microprocessor 42 can be configured into one of these two modes by the manual manipulation of the mode switch 44 or by insertion/removal of a cord from the transmitter into a socket on the receiver 20, as described above.

When the transmitter 18 is placed into primary teach mode, the microprocessor 30 first establishes a unique code set for a primary receiver 20. The code set consists of a function-specific code for each of the motorcycle 16 lighting circuits (i.e., brake, running light, turn signals and hazard circuits) as well as a function-specific code for a stay alive code, if required. In one embodiment of the present invention, the microprocessor 30 randomly selects the codes for the code set from a group of at least 2500 potential codes. In another embodiment, unique codes for each code set are preset at the factory, and remain fixed for the life of each transmitter 18. Once the code set is established, and while the transmitter 18 is still in primary teach mode, the transmitter 18 modulates the code set onto a radio-frequency signal and broadcasts the signal 26 through the antenna 38 to any nearby receiver 20.

When the primary receiver 20 is placed into learn mode before the code set from the transmitter 18 is received, the primary receiver 20 will store the code set in memory 46, overwriting any previously stored code sets. Conversely, if the transmitted code set is received by a receiver 20 that is set in operational mode, the receiver 20 will not overwrite the stored codes. Rather, the receiver 20 that is set in operational mode will compare the code set to the stored codes, and because none of the received codes match the stored codes, the pulse circuit 53 of the receiver 20 will not be activated.

Once the code set has been stored by the primary receiver 20, a wireless link can be established with a secondary receiver 20 (if required), by repeating the sequence of steps outlined above with the transmitter 18 placed in secondary teach mode. Once both receivers 20 have stored a unique code set and been placed in operational mode, one of the receivers 20 can be selected for operational use by setting the mode switch on the transmitter 18 to the desired operational mode for the selected receiver 20. To select the primary receiver 20 which may be attached to the driver's helmet 14, the transmitter 18 can be set to primary operational mode. Similarly, to select the secondary receiver 20 which may be attached to the passenger's helmet 14, the transmitter 18 can be set to secondary operational mode.

While the particular devices and methods as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A lighting system for use with a vehicle having at least one light circuit, said system comprising:
    a transmitter adapted for attachment to said vehicle, said transmitter for transmitting a code in response to a current passing through said light circuit of said vehicle; and
    a receiver for receiving said code, said receiver comprising a pulsing circuit having a pulse generator and at least one lamp, said pulse generator for establishing an electrical pulse package comprising at least two electrical pulses in said pulsing circuit in response to said code being received by said receiver, and said lamps for emitting light pulses in response to said electrical pulse package.

2. A lighting system as recited in claim 1 wherein said light circuit of said vehicle is a brake light circuit.

3. A lighting system as recited in claim 1 wherein said code is a first code, said pulse package is a first pulse package, said lighting circuit is a first lighting circuit, said transmitter is further adapted to transmit a second code in response to a current passing through a second light circuit of said vehicle, and said pulse generator is adapted to establish a second pulse package in said pulsing circuit in response to said second code being received by said receiver.

4. A lighting system as recited in claim 1 wherein said lamp is a light emitting diode.

5. A lighting system as recited in claim 1 wherein said transmitter comprises a means for modulating said code onto a radio-frequency signal for transmission to said receiver.

6. A lighting system as recited in claim 1 wherein said pulse package comprises; a first plurality of pulses having a substantially uniform pulse rate, $\tau_1$, a second plurality of pulses having a substantially uniform pulse rate, $\tau_1$, and a de-energized period; said de-energized period being interposed between said first and second plurality of pulses and having a duration that exceeds the quantity $1/\tau_1$.

7. A lighting system as recited in claim 6 wherein said receiver further comprises a battery connected to said pulsing circuit and said microprocessor, said receiver further comprising a motion sensor for disconnecting said battery from said pulsing circuit and said microprocessor in response to a lack of motion detected by said motion sensor for a predetermined time and for reconnecting said power supply to said pulsing circuit and said microprocessor in response to a detection of motion by said motion sensor.

8. A lighting system as recited in claim 7 wherein said transmitter is adapted to transmit a third code in response to a current passing through the ignition circuit of said vehicle and said lighting system further comprises a means for preventing said motion sensor from disconnecting said power supply from said pulsing circuit and said microprocessor in response to said third code being received by said receiver.

9. A method for establishing a wireless link between a vehicle having a braking circuit and a helmet comprising the steps of:

connecting a transmitter having a first microprocessor to said braking circuit of said vehicle, said transmitter configurable between a teach mode for establishing a braking code and broadcasting a first signal with said braking code modulated thereon and an operational mode for broadcasting a second signal with said braking code modulated thereon in response to a current flowing through said brake circuit of said vehicle;

mounting a receiver having a second microprocessor to said helmet, said receiver configurable between a learn mode for receiving said first signal and storing said braking code into memory, and an operational mode for energizing at least one lamp in response to receiving said second signal; and configuring said transmitter into said teach mode and said receiver into said learn mode to establish a wireless link between said vehicle and said helmet.

10. A method as recited in claim 9 further comprising the following steps:

configuring said transmitter and said receiver into operational mode;

passing a current through said braking circuit to cause said second signal to be broadcast by said transmitter;

receiving said second signal by said receiver;

using said second microprocessor to compare said braking code on said second signal to said braking code on said first signal; and energizing said at least one lamp mounted on said helmet in response to a match between said braking code on said second signal and said braking code on said first signal.

11. A method as recited in claim 9 wherein said first microprocessor establishes said brake code for broadcast on said first signal by randomly selecting a code from among a group of codes having at least twenty five hundred codes.

12. A method as recited in claim 9 wherein said first signal is a radio-frequency signal.

13. A method as recited in claim 9 wherein said at least one lamp is energized by a pulsed current.

14. A method as recited in claim 9 wherein said current is passed through said braking circuit by engaging the vehicle brake lever.

15. A method as recited in claim 9 wherein said helmet is a first helmet, said receiver is a first receiver, said teach mode is a first teach mode, said transmitter operational mode is a first operational mode, and wherein said transmitter is further configurable to a second teach mode and a second operational mode, said second teach mode for establishing and broadcasting a second braking code for receipt by a second receiver mounted on a second helmet.

16. A method as recited in claim 9 wherein said transmitter is reconfigured by manually operating a switch connected to said first microprocessor.

17. A method as recited in claim 9 wherein said step of configuring said transmitter into said teach mode and said receiver into said learn mode is accomplished by plugging a cord extending from said transmitter into a socket located on said receiver and manually setting a mode switch connected to said first microprocessor.

18. A helmet lighting system for use with a vehicle having a brake light circuit, said lighting system comprising:

a transmitter for broadcasting a signal in response to a current passing through said brake light circuit of said vehicle;

a power source;

a lamp;

a means for receiving said signal from said transmitter, said receiving means being active when connected to said power source and inactive when disconnected from said power source, said receiving means for activation to cause an electrical current to flow from said power source to said lamp in response to said signal being received from said transmitter;

a motion sensor for disconnecting said power source from said receiving means after said motion sensor remains motionless for a predetermined period of time; and a means for attaching said power source, said lamp, said receiving means and said motion sensor to a helmet.

19. A lighting system as recited in claim 18 wherein said electrical current is pulsed.

20. A lighting system as recited in claim 18 wherein said power source comprises a battery.

21. A lighting system as recited in claim 18 wherein said lamp comprises a light emitting diode.

22. A lighting system as recited in claim 18 wherein said lamp comprises a strobe.

23. A lighting system as recited in claim 20 further comprising a solar cell for charging said battery.

24. A lighting system as recited in claim 20 wherein said battery is a first battery, a second battery is attached to said vehicle, said transmitter is connected to said second battery, and said transmitter further comprises a cord for connection to said first battery to charge said first battery.

* * * * *